(12) United States Patent
Simon

(10) Patent No.: US 6,467,579 B1
(45) Date of Patent: Oct. 22, 2002

(54) PRESS FOR COMPRESSING LUBRICATING GREASE AND THE CARTRIDGES USED THEREFOR

(75) Inventor: Steffen Simon, Niedermittlau (DE)

(73) Assignee: MATO Maschinen-und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 0 days.

(21) Appl. No.: 09/381,606

(22) PCT Filed: Mar. 20, 1998

(86) PCT No.: PCT/DE98/00825

§ 371 (c)(1),
(2), (4) Date: Sep. 20, 1999

(87) PCT Pub. No.: WO98/43012

PCT Pub. Date: Oct. 1, 1998

(30) Foreign Application Priority Data

Mar. 22, 1997 (DE) .......................... 197 12 151
Nov. 8, 1997 (DE) .......................... 197 49 512

(51) Int. Cl.[7] .............................................. F16N 13/08
(52) U.S. Cl. ...................... 184/105.2; 184/28; 222/327; 222/388
(58) Field of Search ........................... 184/28, 29, 55.1, 184/105.1, 105.2; 222/327, 388

(56) References Cited

U.S. PATENT DOCUMENTS

| | | | | |
|---|---|---|---|---|
| 3,780,830 A | * | 12/1973 | Helgerud et al. ........ | 184/105.2 |
| 4,077,494 A | * | 3/1978 | Spaude et al. ................ | 184/28 |
| 4,572,332 A | * | 2/1986 | Pool ........................ | 184/105.1 |
| 4,664,298 A | * | 5/1987 | Shew ...................... | 184/105.2 |
| 4,676,409 A | * | 6/1987 | Stolz ........................... | 184/28 |
| 5,044,471 A | * | 9/1991 | Machek .................... | 184/105.2 |
| 5,203,839 A | * | 4/1993 | Skaggs ..................... | 184/105.2 |
| 5,277,339 A | * | 1/1994 | Shew et al. .............. | 184/105.2 |
| 5,404,967 A | * | 4/1995 | Barry ....................... | 184/105.2 |
| 5,826,753 A | * | 10/1998 | Fehlig et al. ............ | 184/105.2 |
| 5,918,702 A | * | 7/1999 | Cheng et al. ............. | 184/105.2 |

FOREIGN PATENT DOCUMENTS

| | | | | | |
|---|---|---|---|---|---|
| CH | 182849 | | * | 3/1963 | .............. 184/105.2 |
| DE | 2144459 | | * | 3/1973 | .............. 184/105.2 |
| GB | 1318022 | | * | 5/1973 | .............. 184/105.2 |
| GB | 2273745 | A | * | 6/1994 | .............. 184/105.2 |
| JP | 6-193794 | A | * | 7/1994 | .............. 184/105.2 |

* cited by examiner

*Primary Examiner*—Chong H. Kim
(74) *Attorney, Agent, or Firm*—Price, Heneveld, Cooper, DeWitt & Litton

(57) ABSTRACT

A press for extruding lubricating grease has a press head with a high pressure reciprocating pump, a high-pressure outlet opening with a check valve, a low-pressure intake opening for feeding the mass to be extruded to the reciprocating pump, and a connection on the press head for connecting a pipe thereto. The pipe receives therein a grease filled cartridge having a displaceable trailing piston. A cartridge-connecting element has a connection for the cartridge, and the pipe is open at that end thereof oriented away from the press head, whereby when the cartridge is connected to the cartridge-connecting element, it protrudes from the open end of the pipe, is guided radially by the pipe and is retained axially by the cartridge-connecting element.

24 Claims, 6 Drawing Sheets

PRESS FOR COMPRESSING LUBRICATING GREASE AND THE CARTRIDGES USED THEREFOR

BACKGROUND OF THE INVENTION

The invention concerns a press for extruding lubricating grease, with a press head with a high-pressure reciprocating pump, a high-pressure outlet opening with check valve, a low-pressure intake opening for feeding to the reciprocating pump the mass to be extruded, a device for actuating the pump piston of the reciprocating pump, and a connection on the press head for connecting a pipe to the press head, the pipe containing a lubricating grease filled, cylindrically shaped cartridge with a displaceable trailing piston.

Such a press, in the form of a hand lever press, is known from DE-A-22 14 652. There, the rigid cartridge displays, in the region of its end facing the press head, a circular bead that is clamped between the pipe screwed into the press head and the press head. The bottom of the cartridge, displaying the outlet opening for the viscous mass, is formed in a convex manner, so that its ring edge abuts the press head. Between the bead of the cartridge and the press head is designed a seal, which is likewise intended to prevent the viscous mass from reaching the ring gap formed between the cartridge and the pipe. The end of the pipe turned away from the press head is formed open, so that the position of the trailing piston lodged displaceably in the pipe, and thus the fill level of the cartridge, can be perceived from outside through the opening. The diameter of the opening in the pipe is dimensioned smaller than the outer diameter of the cartridge. To replace a cartridge, it is thus necessary to unscrew the pipe form the press head, insert a new cartridge with bead from the side of the pipe turned away from the press head, and again screw the pipe onto the press head.

The designs of the lever press and of the cartridge to be found in connection with this application have various disadvantages. Thus, it is quite time-consuming to replace the cartridge, because the press head and the pipe must be separated. Furthermore, provision must be made for sealing means between cartridge and press head or pipe. The cartridge is costly to make, since it is not designed as a component with constant inner and outer diameters, but rather displays a bead. The contents of the cartridge, i.e., the type of lubricating grease, is not recognizable from the outside, since indications as to the lubricating grease located in a particular cartridge are not, as a rule, present in the bottom region of the cylinder section of the cartridge.

Known from U.S. Pat. No. 5, 044, 471 is a hand lever press for extruding lubricating grease. There, instead of a cylindrical cylinder, a bellows cartridge is used. This has, among others, the disadvantage that it does not permit a complete and clean emptying. Clamped between the press head and a pipe screwed into this is an attachment element, which displays a connection for the screwing in of the bellows cartridge. The pipe that surrounds the bellows cartridge is closed in the region of its end turned away from the press head and inside the pipe is arranged a compression spring, which is effective between this end and a piston that impinges upon the bellows cartridge. With increasing emptying, the bellows cartridge is compressed. The fill level of the bellows cartridge inserted into the pipe cannot be perceived from outside. To replace the bellows cartridge, the pipe must be unscrewed from the press head.

Known from GB-A 2 273 745 is likewise a hand lever press for extruding lubricating grease in which a bellows cartridge finds application. This bellows cartridge is screwed directly into the press head in the region of the outlet connection piece of the cartridge and is surrounded by a pipe that is likewise screwed into the press head. The pipe is formed open in the region of its end turned away from the press head. The bellows cartridge is located completely inside the space enclosed by the pipe, so that it is protected against damage from outside during use of the press. In order to enable the fill level of the bellows cartridge to be ascertained, the pipe is provided on its side with a slot that extends in the longitudinal direction of the pipe over a part of its length. According to the fill level of the bellows cartridge and thus to the greater spacing of the circumferential bellows edges when the cartridge is full, or, on the other hand, to the lesser spacing of these bellows edges in the partially or completely empty state, the approximate fill level of the bellows cartridge can be perceived through the slot. Since the bellows cartridge collapses with increasing emptying, for its replacement it is necessary to unscrew the pipe from the press head.

Under the type designation MATO DF 500, a pneumatic one-hand press of the firm MATO Machinen-und Metallwarenfabrik Curt Matthaei GmbH & Co. K G, Mühlheim, has become known. This displays a main body that is formed in essence by the pressure unit and the press head. Here, the cartridge, after its sealing cap has been removed, is screwed, together with the grease-pressing cylinder, into the press head. Furthermore, pneumatic presses for lubricating grease are known from DE-A-35 27 925.

A dispenser for issuing pasty masses, for example toothpaste, is known from DE-A 40 13 705. In this dispenser, a cylindrical cartridge with a base is used, which cartridge completes a housing that displays a conveying device, arranged in a head piece, for proportioned issuing of the mass from a mouth piece, under the step-by-step advance of a trailing piston arranged in the cartridge. The cartridge is introduced through the lower opening of the housing into a pipe-shaped section of the housing and the cartridge, along with its socket displaying an outer thread, is screwed into a central housing floor, whereby an annular collar forming the base of the cartridge contacts the housing on the face side. This is necessary so that a cylindrical wall of the cartridge is at the correct distance from a pump piston of the dispenser and the latter thus functions correctly. The dispenser standing open in the region of the cartridge is grasped by one hand on the outside in the region of the housing and an actuating handle integrated in the head piece is pressed by one of the fingers of this hand. With this dispenser the cartridge is guided radially by the pipe-shaped section of the housing and the socket is held axially in the central housing floor. The cartridge is fixed through the contacting of its annular collar on the face side at the housing in the region of the lower opening of the housing.

From DE-A-39 24 926 is known a device for applying fluid, for example a cosmetic fluid, ink, dye, or a liquid pharmaceutical. The fluid is located in a cartridge that is inserted into a shaft and projects out of this in the rear. When the cartridge is moved in the longitudinal direction relative to the shaft, the cartridge moves together with a valve unit that works with it; the valve unit issues the fluid, for example onto a brush.

SUMMARY OF THE INVENTION

The task of the invention is to further develop a press of the type given in the introduction, in such a manner that cartridges used in it can be exchanged quickly and easily.

With this device, the fill level of the cartridge should be perceivable, as well as the type and/or manufacturer of the lubricating grease located inside the cartridge. The sealing between cartridge and press should be ensured. The cartridge should be protected from damage from outside and, on account of the underlying conventional pressing-device type of construction, high stresses during use should be withstood.

The task is accomplished in a press of the type given in the introduction by the fact that provision is made for a cartridge-connecting element that is held between the press head and the pipe, the connecting element displaying a connection for the cartridge, and by the fact that the pipe is formed open in the region of its end turned away from the press head, the cartridge joined to the connecting element projecting from the open end of the pipe, guided by the pipe radially and is held fixed axially through the connecting element.

Thus, in the press according to the invention, provision is made for a cartridge connecting element to which the cartridge is joined, it being essential that the cartridge is inserted into the pipe from the end of the pipe that is turned away from the press head. The sealing of the cartridge results directly at the cartridge-connecting element, which thus forms a stop for the cartridge. The connecting element serves thus not only the holding of the cartridge but also its fixing because of the stop function. Since the cartridge exhibits a greater length than the pipe, the cartridge end protruding from the pipe can be conveniently grasped in order to join the cartridge to the cartridge-connecting element or to separate it from this. In this, it is important that the cylindrical, stiffly designed cartridge protrudes sufficiently far from the pipe. This ensures that the cartridge can be well grasped and firmly screwed in, with the result that an airtight connection between cartridge and connecting piece, necessary for the functioning of the press according to the invention, is produced. Thus, the drawing of the lubricating grease from the cartridge during operation of the press is ensured. Since for replacement of the cartridge the pipe need not be removed from the press head, the cartridge can be replaced very quickly and easily and the operation of the press is substantially simplified. Beyond this, the cartridge is protected by the pipe. The cartridge end protruding from the pipe is marked with indications concerning the type of lubricating grease and/or the manufacturer. Through the fact that the end of the pipe oriented away from the press head is open, the position of the trailing piston of the cartridge can be determined at any time, and thus its fill level.

The cartridge-connecting element can be designed as a separate component or can be integrated into the press head. The latter is of advantage in particular with a press head produced in a molding or casting process. In a preferred implementation form, provision is made for a cartridge-connecting element formed as a separate component that is held between the press head and the pipe.

Preferably, the press is designed as a hand-lever press, one-hand press, or pneumatic press.

If the press is designed as a hand lever press and has only one hand lever, namely that for actuating the pump piston, then the pipe takes on the function of a grip, i.e., during operation the hand lever press is grasped at the grip and the hand lever. The number of components of the hand lever press can be considerably reduced with respect to the conventional hand lever press with the pipe, piston rod, compression spring, collar, and clamp lever. The production costs of the hand lever press according to the invention is therefore correspondingly lower.

The concept of the press according to the invention makes possible a substantially improved tightness compared to a press with a collar. The cartridge is closely joined to the cartridge-connecting element, which for its part is positioned between the pipe and the press head so as to be sealed. The trailing piston is optimally matched to the cartridge.

Preferably, the cartridge-connecting element is designed as a rotationally symmetrical body, with a bead that is wedged between press head and the pipe screwed into the latter, in particular with one or more sealing elements interposed. The cartridge-connecting element is thus positioned between the press head and the pipe during the assembly of the press. Between the cartridge-connection element and the actual bottom of the press head remains a space for receiving the viscous mass, which space is connected to the low-pressure intake opening of the press head. Preferably, this space is so formed that an optimal streaming of the viscous mass out of the cartridge and into the press head is ensured. The sealing between the bead of the cartridge-connection element and the press head is undertaken appropriately by means of a sealing ring, or, in the case of a plastic part, through the part itself.

According to a first preferred implementation form of the invention, the cartridge-connection element is designed so that it has a threaded connection for the cartridge in the region of the outlet opening. Thus, provision is made for a screw connection between the cartridge and the cartridge-connection element. According to an advantageous further development, the cartridge-connection element is disc-shaped and possesses a perforating central threaded bore for receiving a projection of the cartridge displaying an outer thread, the threaded projection being provided with the outlet opening for the viscous mass. Alternatively, the cartridge-connection element can have a connecting piece with an outer thread and an inner opening, the outlet opening of the cartridge having an inner thread. The two above-specified configurations thus require different designs of the cartridge, one the one hand with a projection with an outer thread, and on the other hand an opening with an inner thread made in the base of the cartridge.

According to a second preferred implementation form of the invention, the cartridge-connection element has a plug connector for the cartridge. In this case, in an advantageous further development the cartridge-connection element is designed in a ring-shaped manner, in which the wall strength of the ring can be calculated so as to be relatively low, since in this implementation form, no thread for connecting the cartridge to the cartridge-connection element is required. According to a useful design, the cartridge-connection element is provided with a recess in the region of its outer diameter, centered in the end oriented towards the press head, as well as in the end of the cartridge-connection element oriented away from the press head, for the purpose of inserting the cartridge between the connecting element and the pipe. It is considered especially advantageous if the cartridge-connection element is provided with a groove in the region of its recess for a locking connection to a bead of the cartridge and/or with a groove for receiving a sealing ring, in particular an elastic O-ring.

In principle, also realizable is a one-piece cartridge-connection element, in which through selection of a suitable material both a sealing effect and a fixing can be achieved.

The press so characterized can be loaded with a full cartridge in an especially simple manner, since after the removal of a sealing cap turned towards the press, the cartridge is merely slid into the press pipe and, by means of a thrust, is pressed over the connecting element. Just as easily the empty cartridge can be removed again by a simple pulling away. A further advantage of this solution is the fact that the connecting element can be produced with an inner diameter that approaches the inner diameter of the cartridge, whereby an optimal viscous-mass influx space for the inflow into the inlet opening of the press is provided.

The cartridge-connecting element consists preferably of plastic or metal. The cartridge consists preferably of plastic and is designed as a relatively stiff component. The press head and the pipe consist preferably of metal.

Since the cartridge is screwed or inserted, as the case may be, into the pipe from behind, the outer diameter of the cartridge must be adapted only to the inner diameter of the pipe. In this connection it is suggested that the cartridge be cylinder-shaped and that the outer diameter of the cartridge be slightly smaller than the inner diameter of the pipe, so that the cartridge is seated in the pipe largely without play. Consequently, during the insertion of a new cartridge, the latter is brought into the connection position at the cartridge-connection element in a defined manner. When the cartridge has been inserted into the cartridge-connecting element, the cartridge should protrude from the pipe approximately 20 to 50 mm. On this protruding cartridge end can be marked, for example, the type of grease as well as the supplier.

A specially designed cylindrical cartridge for receiving a viscous mass, in particular lubricating grease, can be used not only with the press designed according to the invention, employing a cartridge-connecting element provided with a thread, but also with conventional presses that have the piston rod and the collar that is prestressed by means of a pring.

Such a universally applicable cylindrical cartridge has a pipe section with inner and outer diameters that remain constant over its length, the trailing piston being seated in the pipe section so as to be displaceable and the cartridge displaying a flat base, which is provided with a central opening for letting the viscous mass out of the cartridge; also, the base possesses an inner thread in the region of the opening. The cartridge formed in this manner can, on the one hand, be screwed onto the cartridge-connecting element displaying the threaded projection, and on the other hand can be used with conventional presses, by virtue of the flat design of the cartridge base. After the retraction of the piston rod and its locking by means of the clamp lever, the cartridge is inserted into the unscrewed pipe from the press-head side and the pipe is again screwed to the press head. In order that the piston rod can be pushed in, the trailing piston is provided with, for example, a central predetermined breaking point. When the piston rod is pushed in, the nose of the piston rod breaks through the predetermined breaking point of the trailing piston and the nose of the piston rod, when the latter is pushed completely into the pipe, passes through the central opening of the cartridge. Through the ring gap between the piston rod, or rather its nose, and the central opening in the cartridge base, the viscous mass can be discharged from the cartridge into the press head upon compression. Instead of the design of the trailing piston with a central predetermined breaking point, it is also possible to fashion the trailing piston in such a manner that it is removed before the insertion of the cartridge into the unscrewed pipe. In this case, the collar presses not upon the trailing piston, but rather directly upon the viscous mass located in the cartridge. In order that a sufficient volume remains between the cartridge and the press head for the viscous mass to continue flowing, in particular in the region of the low-pressure intake opening, the cartridge should have in the region of its base a protruding ring bead, by means of which the cartridge supports itself against the lid of the press head or a sealing element that is adjacent to this.

An empty cartridge is either replaced with a new, full cartridge or it is refilled. The latter is possible without unscrewing the pipe from the press head by, for example, the fact that the press head is provided with a filling valve.

Further features of the invention are presented in the description of the figures and in the figures themselves;

BRIEF DESCRIPTION OF THE DRAWINGS

In the figures the invention is represented with the aid of several implementation forms or embodiments as examples, without being limited to this Shown are.

DETAILED DESCRIPTION OF THE PREFERRED EMBODIMENTS

Figure 1:
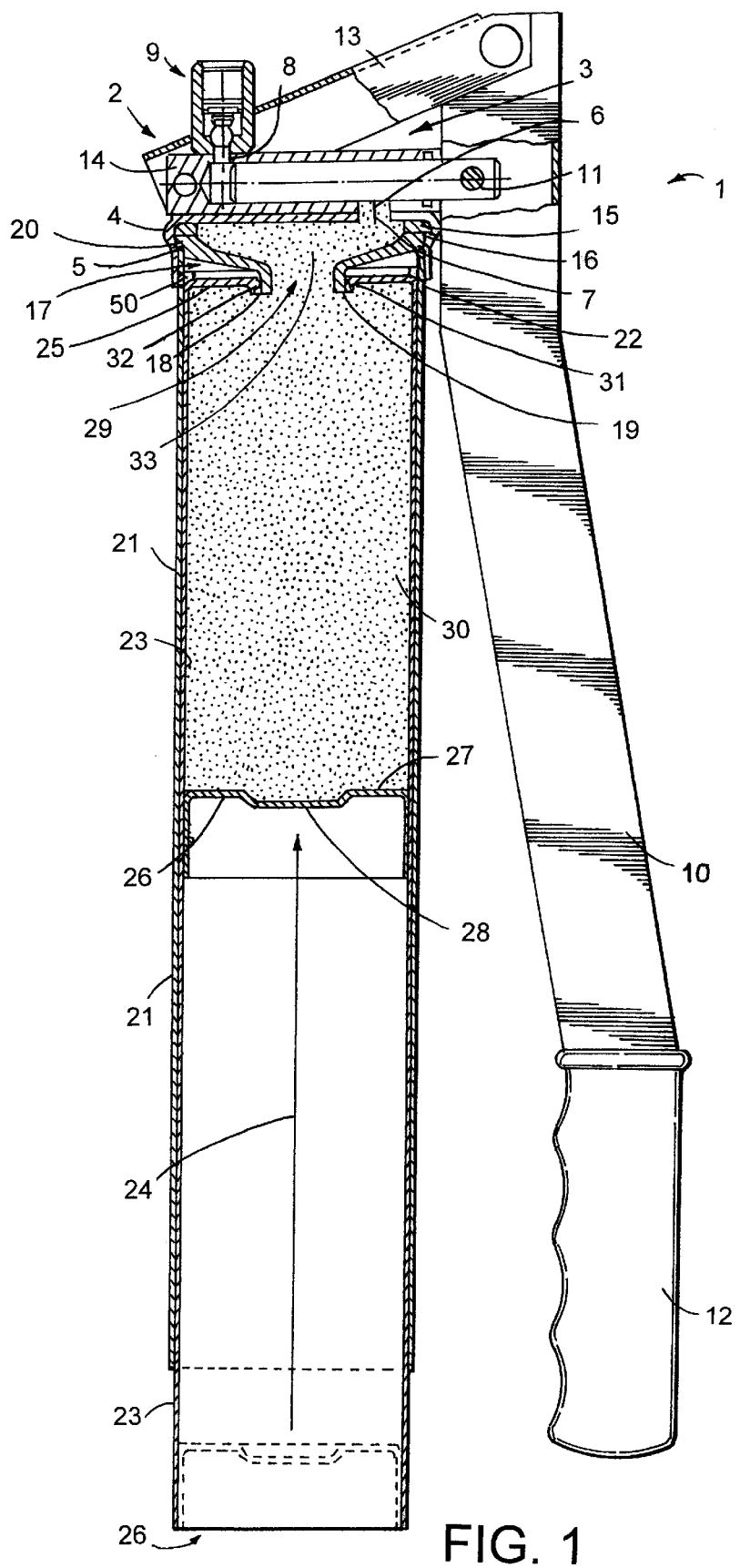
FIG. 1: a first implementation form of a hand lever press, in a longitudinal central section.

The hand lever presses 1 illustrated in FIGS. 1 through 4, for extruding a viscous mass, in particular lubricating grease, display a press head 2 with a high-pressure reciprocating pump 3. The latter is connected to a lid 4, which is provided with an inner thread 5. The reciprocating pump 3 has a low-pressure intake opening 6 that is in alignment with a bore 7 in the lid 4. In addition, the reciprocating pump 3 is provided with a high-pressure outlet opening 8, into which a check valve 9 is inserted. A hand lever 10 is attached to the piston 11 of the reciprocating pump 3 so as to be swingable. The end of the hand lever 10 that is opposite from the hand grip 12 is connected to a connecting lever 13 in an articulated manner; the other end of the connecting lever 13 is attached in an articulated manner to the housing 14 of the reciprocating pump 3.

The lid 4, which is of an essentially rotationally-symmetric form, has in its crease region at its edge a bead 15 that is directed outward. In the region of this bead 15 a sealing ring 16 is set into the lid. A cartridge-connecting element 17, formed rotationally-symmetric, is essentially cone-shaped and has a projection 18 with an outer thread 19 arranged in its tapered region as well as a bead 20 extending outward in its region that is turned toward the bead 15 or the sealing ring 16. The outer diameter of the bead 20 is adapted to the inner diameter of the threaded section of the lid 4 in such a manner that the cartridge-connecting element can be inserted into the lid 4 against the sealing ring 16 with minimal play. A pipe 21 of constant inner diameter and constant wall strength, which pipe is provided in the region of its end turned or oriented towards the press head 2 with an outer thread 22, can be screwed into the inner thread 5 of the lid 4, whereby the pipe 21 contacts with its front surface the bead 20 of the cartridge-connecting element 17 and presses the latter against the sealing ring 16. The pipe thereby effects a tight connection between the cartridge-connecting element 17 and the lid 4.

Inserted into the pipe is a cylindrical cartridge 23, which has the same outer diameter over its entire length, which diameter is slightly smaller than the inner diameter of the pipe 21, so that the cartridge can be inserted into the pipe 21 from the rear, thus in the direction of the arrow 24, in an essentially play-free manner. The cartridge consists of stiff plastic and possesses in the region of its end turned towards the cartridge-connecting element 17 a flat base 25, as well as a trailing piston 26 at its opposite end. This piston is provided with a predetermined breaking point 28 in the central region of its piston plate 27. The base 25 of the cartridge 23 has, concentrically with the longitudinal central axis of the cartridge 23, an outlet opening 29 for the grease 30 contained in the cartridge, the ring section 31 that forms the opening 29 being provided with an inner thread 32 whose thread diameter corresponds to that of the outer thread 19 of the projection 18 on the cartridge-connecting element 17. Located on the outer edge of the base 25 is an axially-extending ring bead 50.

Not shown in the figures is a sealing element, in particular a sealing element formed as a threaded stopper that is screwed into the outlet opening 29 of the cartridge 23 and seals it up until the loading of the hand lever press. If the hand lever press is to be loaded, the sealing element is unscrewed and it is only necessary to insert the filled cartridge 23 into the pipe 21 and to screw it to the cartridge-connecting element 17. The length of the cartridge 23 here so calculated that it protrudes from the pipe 21 when screwed on the cartridge-connecting element 17; it can thereby be optimally grasped and in addition the information applied to the cartridge concerning type of grease and/or grease supplier is visible. FIG. 1 illustrates with dashed lines the tailing piston 26 with a completely full cartridge 23 and with solid lines the piston when a cartridge is approximately half empty. The actual extrusion of the viscous mass, in particular the lubricating grease, takes place here in the following manner: The hand lever press 1 is grasped with two hands, one hand gripping the pipe 21 in the region of its free end, the other hand the grip 12 of the hand lever 10. If the grip 12 is moved away from the pipe 21, the piston 11, with a closed check valve 9, produces a vacuum in the cylinder of the reciprocating pump 3. As soon as the hand lever 10 has been swung far enough that the piston 11 unblocks the openings 6 and 7, the lubricating grease flows from the space 33 formed inside of the cartridge-connecting element 17 into the cylinder 14 of the reciprocating pump 3, so that upon the swinging back of the hand lever, and thus the progressing of the piston 11, the grease is fed through the high-pressure outlet opening 8 and the connection with the check valve 9. If at the start there is no grease in the space 33, several pump strokes must be carried out; in this, the inflow of grease into the space 33 can be supported by manual pressing on the trailing piston 26.

Figure 3:
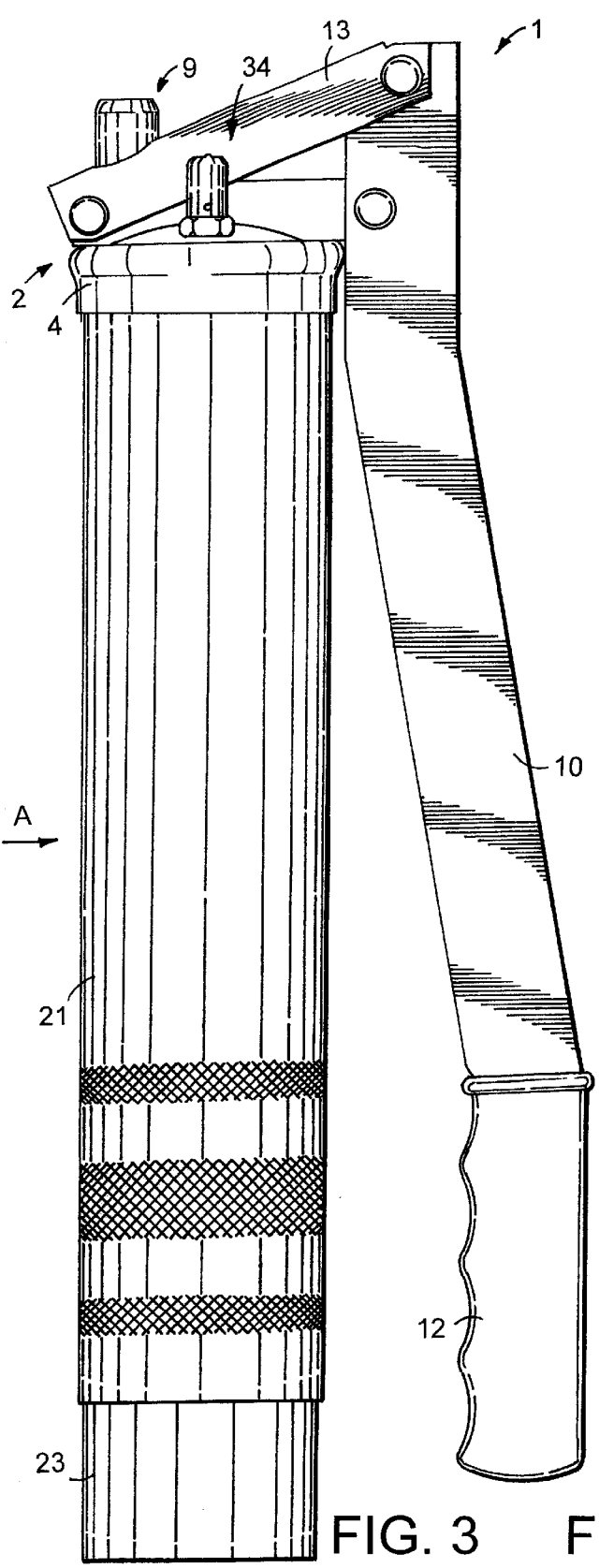
FIG. 3: a side view of the hand lever presses illustrated in FIGS. 1 and 2.
Figure 4:
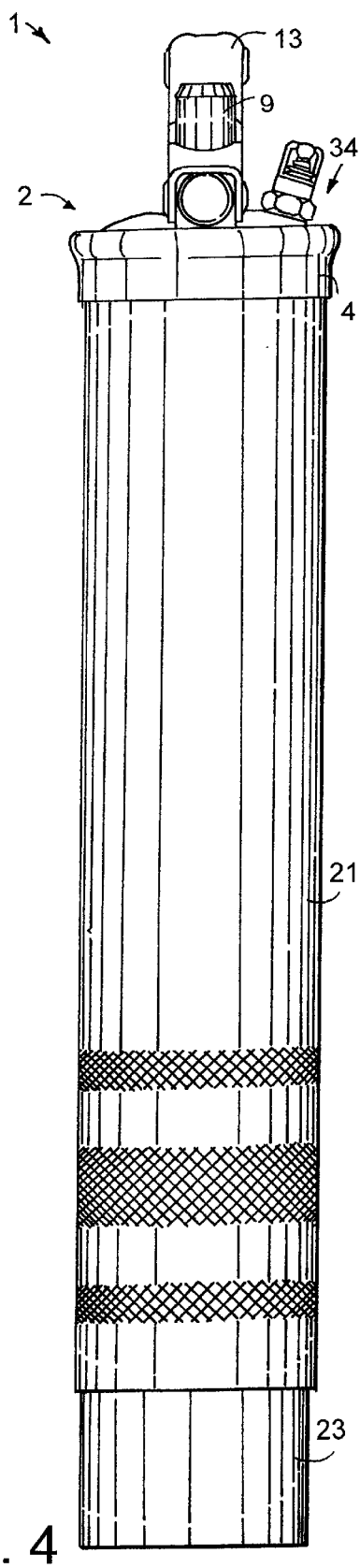
FIG. 4: a front elevational view of the hand lever press illustrated in FIG. 3.

As can be seen in FIGS. 3 and 4, the press head 2 has in has a filling valve 34 via which the emptied cartridge 23 can be refilled, unless the exchanging of an empty cartridge with a new, filled cartridge is desired. The filling valve 34 is designed as a check valve.

If an emptied cartridge 23 is to be replaced by a new one, it is necessary merely to seize the empty cartridge in the region where it projects from the pipe 21 and to unscrew it from the cartridge-connecting element 17. Then a new cartridge 23 can be inserted into the pipe 21 and screwed onto the cartridge-connecting element 17.

Figure 2:
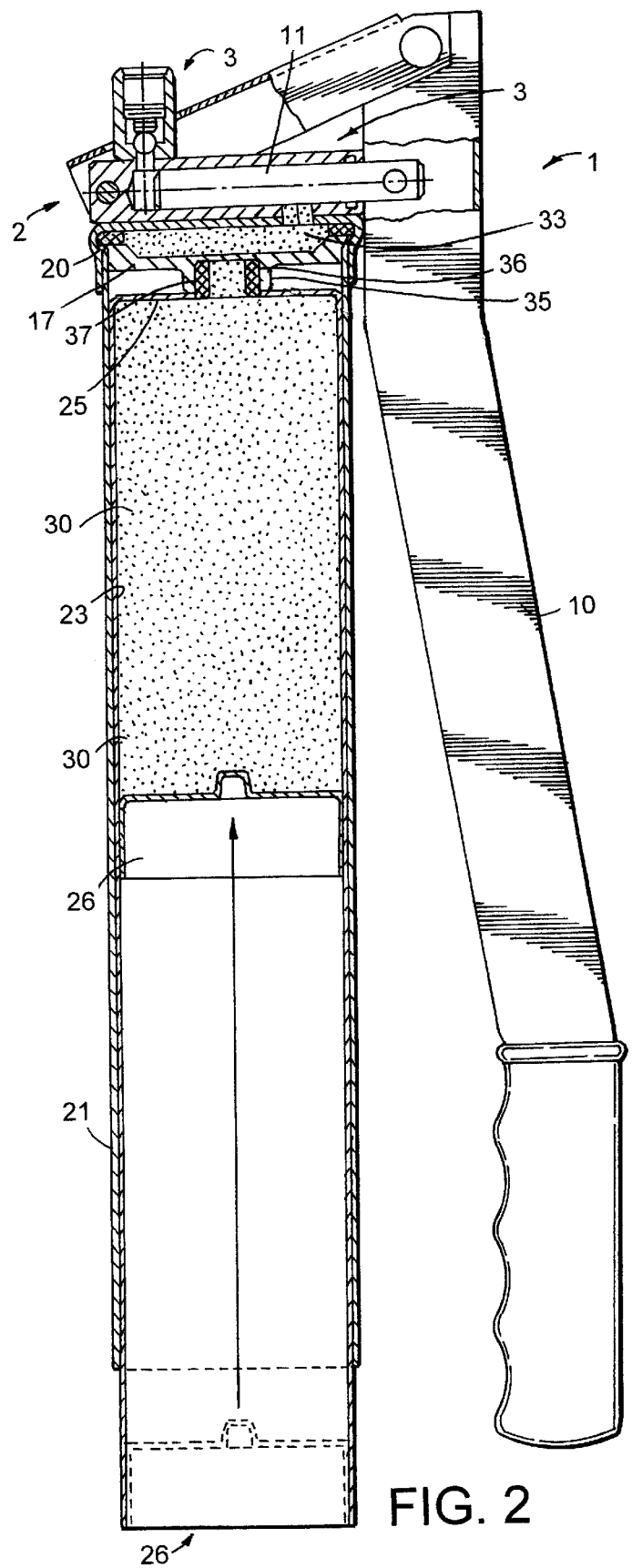
FIG. 2: a second implementation form of a hand lever press, in a longitudinal central section.

In the implementation form according to FIG. 2, the cartridge-connecting element 17 and the cartridge 23 are modified with respect to the implementation form according to FIG. 1. Instead of a ring section 31 with an inner thread 32, the cartridge 23 has in the region of its base 25 a central projection 35 with an outside thread 36, which projection is pointed towards the lid 4, and the ring bead is not present. Instead of the design of the cartridge-connecting element 17 as a conical component with a projection 18 and an outer thread 19, the cartridge-connecting element 17 is formed as a thick-walled plate with a bead 20, the plate displaying a bore with an inner thread 37. With this design, just as with the implementation form according to FIG. 1, the cartridge-connecting element 17 is held fast in the region of its bead 20 between the pipe 21 and the lid 4, or the sealing ring 16 set into this. The cartridge 23 is screwed into the cartridge-connecting element 17 in the region of the projection 35 of the cartridge.

Figure 5:
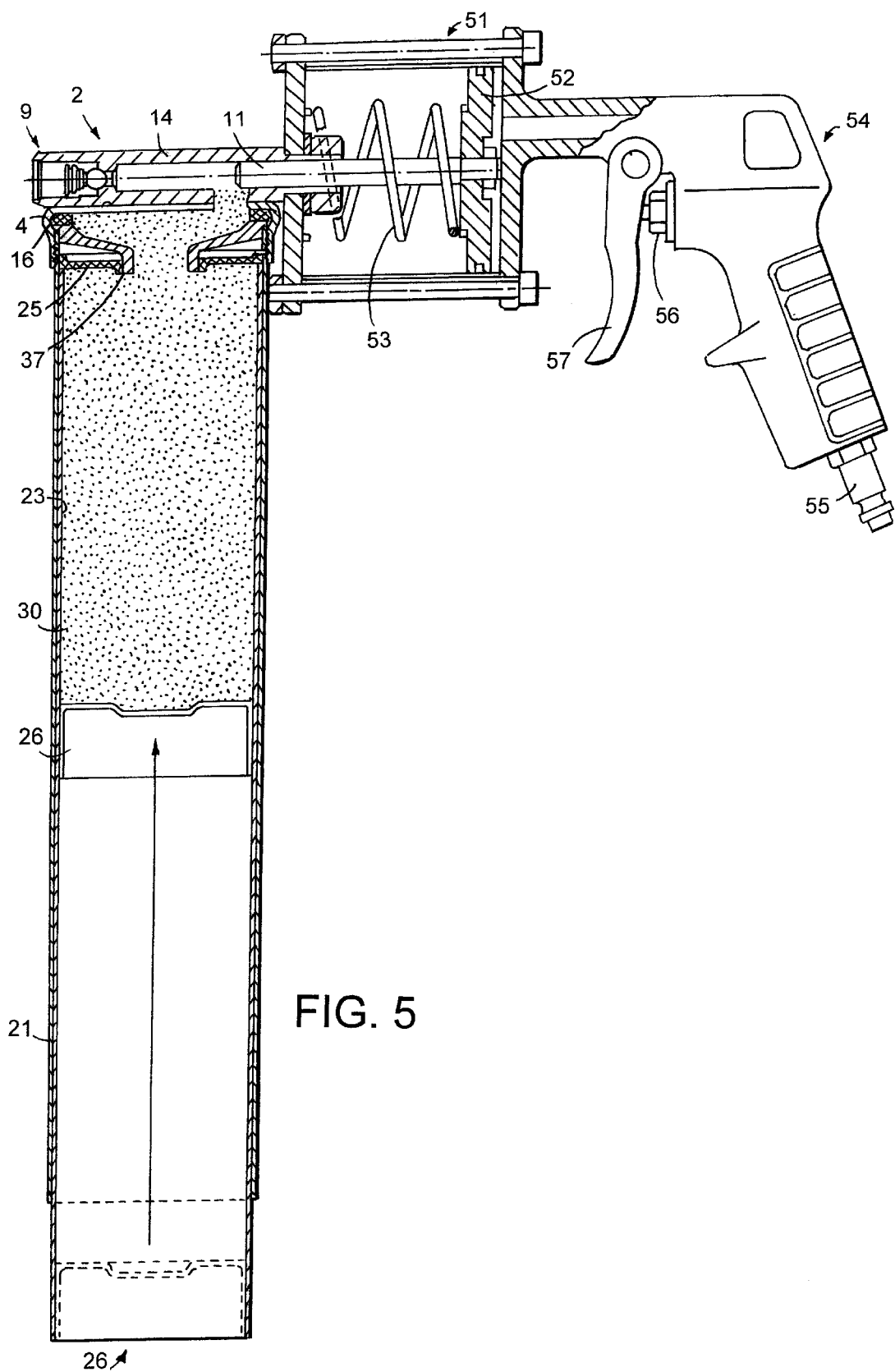
FIG. 5: an implementation form of a pneumatic press, in a longitudinal central section.

FIG. 5 shows an implementation form of the press according to the invention that is designed as a pneumatic one-hand press. In this, the lid 4, the pipe 21, and the cartridge-connecting element 17 are designed in accordance with the corresponding parts of the implementation form according to FIG. 1. The cartridge-connecting element serves to receive the above-described cartridge 23. To this extent, reference is made to the preceding implementations. In the pneumatic one-hand press the housing 14 of the reciprocating pump 3, which housing is connected to the lid 4, shows the check valve 9 with a high-pressure outlet opening 8. Connecting to the reciprocating pump 3 is a pneumatic cylinder 51, whose piston 52 is displaceable against the force of a spiral spring 53 by means of pressurized air. Connected to the air piston 52 is the piston 11 of the high-pressure reciprocating pump 3. Flanged onto the pneumatic cylinder 51 is a grip component 54, which displays a pressurized air connection 55 as well as a valve 56 with a trigger arm 57 for triggering the lifting of the piston 52.

Figure 6:
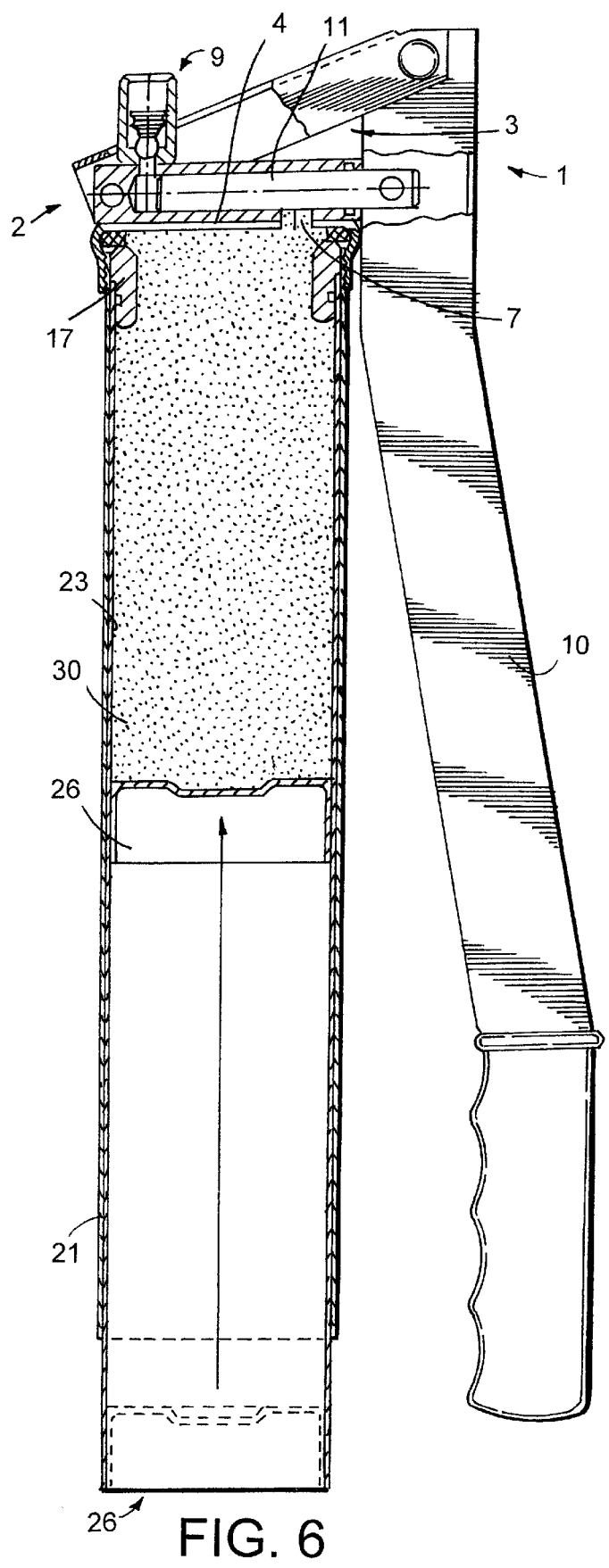
FIG. 6: a third implementation form of a hand lever press, in a longitudinal central section.
Figure 7:
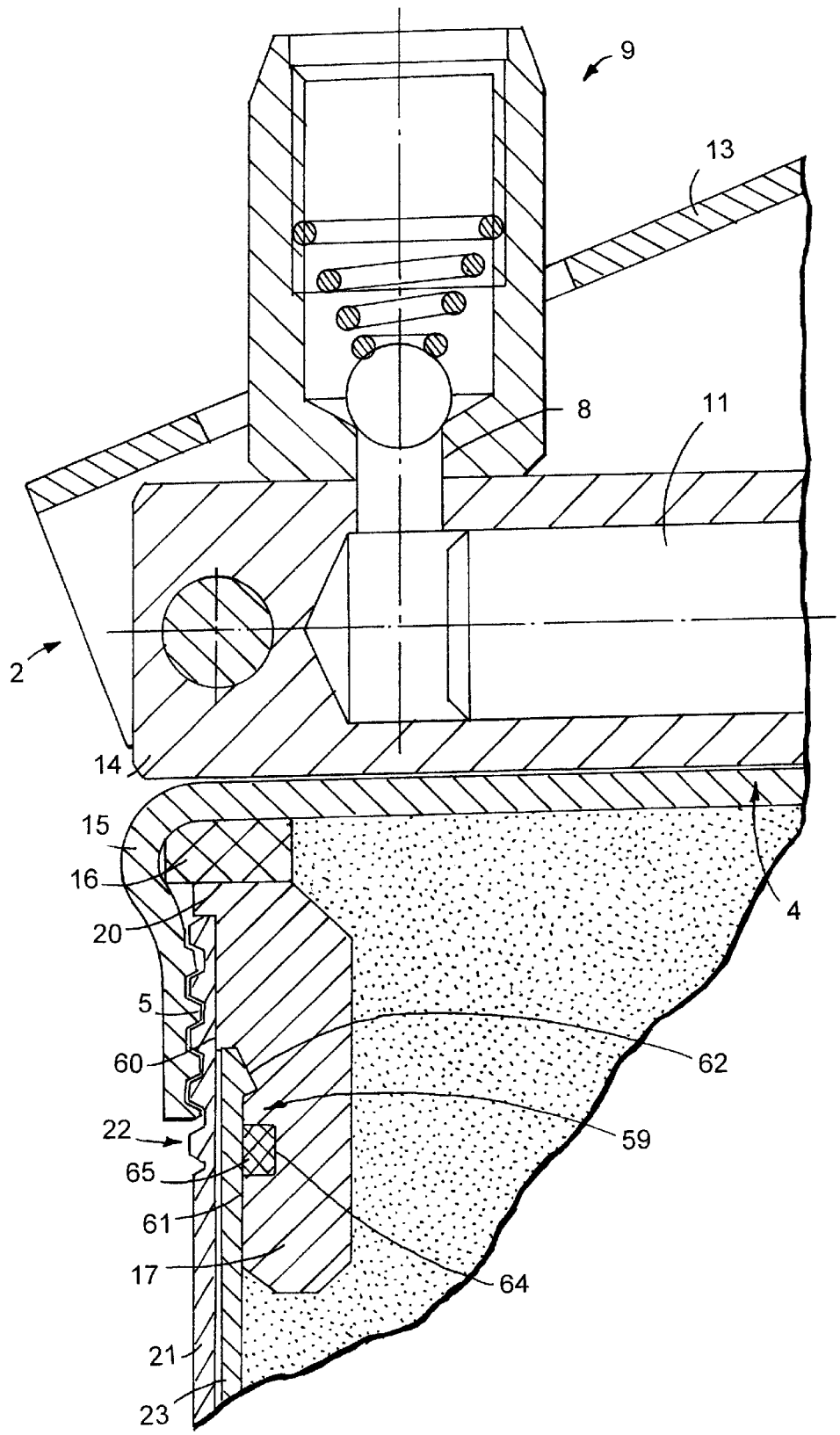
FIG. 7: an enlarged representation of the press shown in FIG. 6, in the region of the cartridge-connecting element.

The implementation form of the press according to FIGS. 6 and 7 is modified with respect to the implementation forms according to FIGS. 1, 2, and 5 by the fact that, instead of the threaded connection of cartridge 23 and cartridge-connecting element 17 described in the context of the last-named implementation form, provision is made for a plug connection 59 between these parts. Parts of these implementation forms that correspond in their function and/or in their structure are marked with the same reference numerals for the sake of simplicity.

FIG. 7, which illustrates the press in the region of the lid 4 on an enlarged scale, shows the ring-shaped cartridge-connecting element 17, which in the region of its outer diameter 60 is centered in the pipe end turned towards the press head 2, in the region of the inner diameter of the pipe. The end of the cartridge-connecting element 17 oriented away from the press head 2 is provided with an outer, circular recess 61 for sticking the cartridge 23 between the connecting element 17 and the pipe 21. In addition, the cartridge-connecting element 17 has in the region of its recess 61 a groove 62 for an engaged connection to a bead 63 of the cartridge 23. The recess 61 is furthermore provided with a ring groove 64 for receiving a sealing ring 65. This sealing ring 65, formed as an O-ring, seals the connecting element 17 completely at the cartridge 23. The connection and disconnection of the cartridge-connecting element 17 and the cartridge 23 takes place in a simple manner through the insertion of the free end of the cartridge into the connecting element 17 and the pulling of the cartridge 23 off of the cartridge-connecting element 17.

What is claimed is:

1. In a press for extruding lubricating grease having a press head with a high-pressure reciprocating pump, a high-pressure outlet opening with a check valve, a low-pressure intake opening for feeding to said reciprocating pump the mass to be extruded, an actuator for said reciprocating pump, and a connection on said press head for connecting a pipe to said press head; said pipe containing a lubricating grease filled, cylindrically shaped cartridge with a displaceable trailing piston, the improvement comprising:

a cartridge-connecting element having a connection for said cartridge, and wherein said pipe has a length which extends greater than half the length of said cartridge, and is formed open in the region of that end oriented away from said press head, whereby said cartridge, when connected to said cartridge-connecting element, protrudes from the open end of said pipe, is guided radially by said pipe, and is retained axially by said cartridge-connecting element.

2. A press as set forth in claim 1, wherein:
said cartridge-connecting element comprises a separate component that is held between said press head and said pipe.

3. A press as set forth in claim 1, wherein:
said press comprises a hand lever press.

4. A press as set forth in claim 1, wherein:
said press comprises a one-hand press.

5. A press as set forth in claim 1, wherein:
said press comprises a pneumatic press.

6. A press as set forth in claim 1, wherein:
said cartridge-connecting element has a rotationally-symmetric body, with a bead, which is clamped in between said press head and said pipe screwed into the latter, and a sealing element interposed between the same.

7. A press as set forth in claim 1, wherein:
said cartridge-connecting element has a threaded connection for said cartridge.

8. A press as set forth in claim 7, wherein:
said cartridge-connection element has a disc and a central threaded bore that passes through said disc and serves to receive a projection of said cartridge that has an outer thread; said threaded projection being provided with said outlet opening for the viscous mass.

9. A press as set forth in claim 7, wherein:
said cartridge-connecting element has a projecting connection piece with an outer thread and an inner opening; and
said outlet opening of said cartridge having an inner thread.

10. A press as-set forth in claim 1, wherein
said cartridge-connecting element has a plug connection for said cartridge.

11. A press as set forth in claim 10, wherein:
said cartridge-connecting element has a ring shape.

12. A press as set forth in claim 10, wherein:
is a cartridge-connecting element is centered in the region of its outer diameter in that end of said pipe that is oriented towards said press head, and that end of said cartridge-connecting element oriented away from said press head is provided with a recess for inserting said cartridge in between said connecting element and said pipe.

13. A press as set forth in claim 12, wherein:
said cartridge-connecting element is, in the region of the recess, provided with a groove for a locking connection to a bead of said cartridge and/or is provided with a groove for receiving a sealing ring.

14. A press as set forth in claim 1, wherein:
said cartridge-connecting element is constructed of plastic or metal.

15. A press as set forth in claim 1, wherein:
said cartridge has a cylindrical shape, and the outer diameter of said cartridge is slightly smaller than the inner diameter of said pipe.

16. A press as set forth in claim 1, wherein:
said cartridge, when connected to said cartridge-connecting element, protrudes 20 to 50 mm from said pipe.

17. A press as set forth in claim 1, wherein:
said press head is provided with a filling valve.

18. A press for extruding lubricating grease and the like, comprising:

a press head having a high-pressure pump with a low-pressure intake opening;

an actuator shifting said pump to draw lubricating grease through said low-pressure intake opening into said pump;

a grease cartridge having an inner end thereof with threads communicating with said low-pressure intake opening, and an outer end thereof with a trailing piston therein which shifts as lubricating grease is drawn from said grease cartridge;

a pipe having an inner end thereof connected with said press head, and a hollow interior shaped to closely receive and retain said grease cartridge therein; said pipe having a length which extends along a major portion of said grease cartridge to protect the same, and terminates at an open outer end disposed such that the outer end of said grease cartridge protrudes from the open outer end of said pipe a distance sufficient to grasp said grease cartridge; and a cartridge-connecting element having a first end thereof sealingly engaged between said press head and said inner end of said pipe, and a second end thereof with threads which threadedly engage said threads on the inner end of said cartridge to securely yet removably connect said cartridge to said press.

19. A press as set forth in claim 18, wherein:
said cartridge-connecting element comprises a separate component that is held between said press head and said pipe.

20. A press as set forth in claim 18, wherein:
said cartridge-connecting element has a rotationally-symmetric body, with a bead, which is clamped in between said press head and said pipe screwed into the latter, and a sealing element interposed between the same.

21. A press for extruding lubricating grease and the like from a removable cartridge of the type having an inner end with a detachable connector, and an outer end with a trailing piston; said press comprising:

a press head having a high-pressure pump with a low-pressure intake opening;

an actuator shifting said pump to draw lubricating grease through said low-pressure intake opening into said pump;

a pipe having an inner end thereof connected with said press head, and a hollow interior shaped to closely receive and retain a grease filled cartridge therein; said pipe having a length which is configured to extend along a major portion of the cartridge to protect the same, and terminates at an open outer end disposed such that the outer end of the cartridge protrudes from the open outer end of said pipe a distance sufficient to grasp the cartridge; and a cartridge-connecting element having a first end thereof for sealing engaged between said press head and said inner end of said pipe, and a second end thereof with a detachable connector which engages the detachable connector on the inner end of the cartridge to securely yet removably connect the cartridge to said press.

22. A press as set forth in claim 21, wherein:

said cartridge-connecting element comprises a separate component that is held between said press head and said pipe.

23. A press as set forth in claim 21, wherein:

said cartridge-connecting element has a rotationally-symmetric body, with a bead, which is clamped in between said press head and said pipe screwed into the latter, and a sealing element interposed between the same.

24. A press as set forth in claim 21, wherein:

said cartridge-connecting element has a threaded connection for the cartridge.

* * * * *

UNITED STATES PATENT AND TRADEMARK OFFICE
CERTIFICATE OF CORRECTION

PATENT NO. : 6,467,579 B1 Page 1 of 1
DATED : October 22, 2002
INVENTOR(S) : Steffen Simon It is certified that error appears in the above-identified patent and that said Letters Patent is hereby corrected as shown below:

Column 1,
Line 34, "form" should be -- from --.

Column 5,
Line 34, "pring" should be -- spring --.

Column 6,
Line 17, after "this" insert -- . (period) --.

Column 7,
Line 60, "has" should be -- addition --.

Column 9,
Line 61, "in a" should be -- said --.

Column 11,
Line 11, "for sealing" should read -- sealingly --.

Signed and Sealed this

Twenty-fifth Day of February, 2003

JAMES E. ROGAN
*Director of the United States Patent and Trademark Office*